United States Patent

Pelegris

[19]

[11] Patent Number: 5,883,953
[45] Date of Patent: Mar. 16, 1999

[54] TELEPHONE AND DATA COMMUNICATIONS LINE PROTECTION MODULE AND GROUNDING SPRING CLIP

[75] Inventor: Dimitris Jim Pelegris, Mount Prospect, Ill.

[73] Assignee: Oneac Corporation, Libertyville, Ill.

[21] Appl. No.: 749,147

[22] Filed: Nov. 14, 1996

[51] Int. Cl.⁶ .................................................. H04M 1/00
[52] U.S. Cl. .......................................... 379/399; 379/412
[58] Field of Search .................................. 379/399, 327, 379/329, 331, 419, 412, 438, 451, 437; 361/725, 727, 329, 824, 331; 439/49, 61, 95, 96

[56] References Cited

U.S. PATENT DOCUMENTS

| | | | |
|---|---|---|---|
| 4,087,655 | 5/1978 | Massey | 179/175 |
| 4,309,736 | 1/1982 | Lissillour | 361/119 |
| 4,313,147 | 1/1982 | Uchida et al. | 361/119 |
| 4,331,839 | 5/1982 | Baumbach | 179/98 |
| 4,616,288 | 10/1986 | Scholtholt et al. | 361/119 |
| 4,667,272 | 5/1987 | Fasano | 361/394 |
| 4,729,064 | 3/1988 | Singer, Jr. | 361/426 |
| 4,758,920 | 7/1988 | McCartney | 361/119 |
| 4,846,735 | 7/1989 | Teichler et al. | 439/709 |
| 4,856,060 | 8/1989 | Meyerhoefer et al. | 379/412 |
| 4,901,190 | 2/1990 | Scholtholt | 361/119 |
| 4,905,275 | 2/1990 | Meyerhoefer et al. | 379/327 |
| 4,924,345 | 5/1990 | Siemon et al. | 361/111 |
| 4,941,063 | 7/1990 | McCartney et al. | 361/119 |
| 5,299,088 | 3/1994 | Honl et al. | 361/119 |
| 5,341,269 | 8/1994 | Hayward et al. | 361/119 |
| 5,357,568 | 10/1994 | Pelegris | 361/119 |
| 5,359,657 | 10/1994 | Pelegris | 379/412 |
| 5,490,215 | 2/1996 | Pelegris | 379/412 |
| 5,504,654 | 4/1996 | Knox et al. | 361/119 |
| 5,509,066 | 4/1996 | Saligny | 379/327 |
| 5,515,436 | 5/1996 | Bonvallat | 379/412 |

FOREIGN PATENT DOCUMENTS 133409   12/1994   Canada .
338187B1 12/1993   European Pat. Off. .

OTHER PUBLICATIONS

Anixer Brochure, Krone Wiring System pp. 1–151, 1–152, dated 1995.

Primary Examiner—Jack Chiang
Attorney, Agent, or Firm—Mason, Kolehmainen, Rathburn & Wyss

[57] ABSTRACT

A telephone and data communications line protection apparatus is provided for protecting at least one telephone line pair. The telephone and data communications line protection apparatus includes a housing containing protection circuitry for protecting at least one telephone line pair. The housing includes a cavity for receiving a terminal portion of an electrical grounding, earthing spring clip member. The protection circuitry includes an electrical grounding contact extending into a housing cavity for electrical and mechanical contact engagement with the terminal portion of the electrical grounding, earthing spring clip member. The electrical grounding, earthing spring clip member has a predetermined profile corresponding to the housing. The electrical grounding, earthing spring clip member includes an aperture to receive a grounding wire.

10 Claims, 2 Drawing Sheets

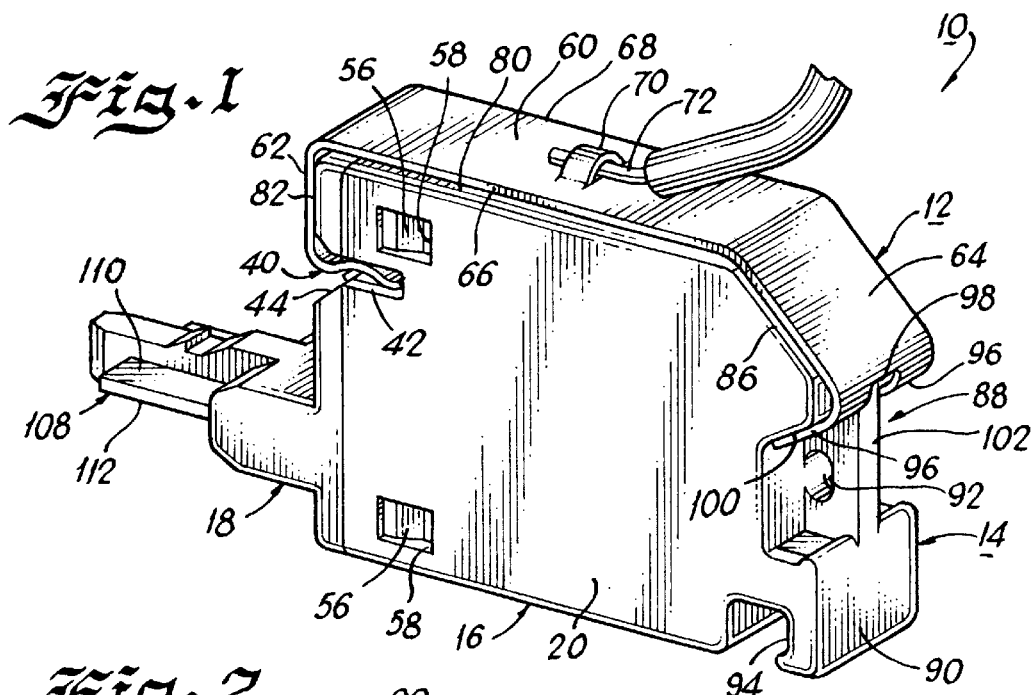
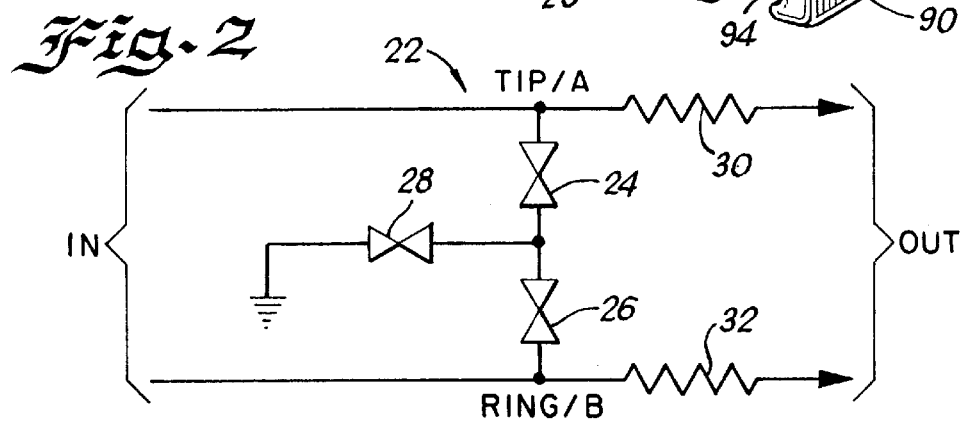
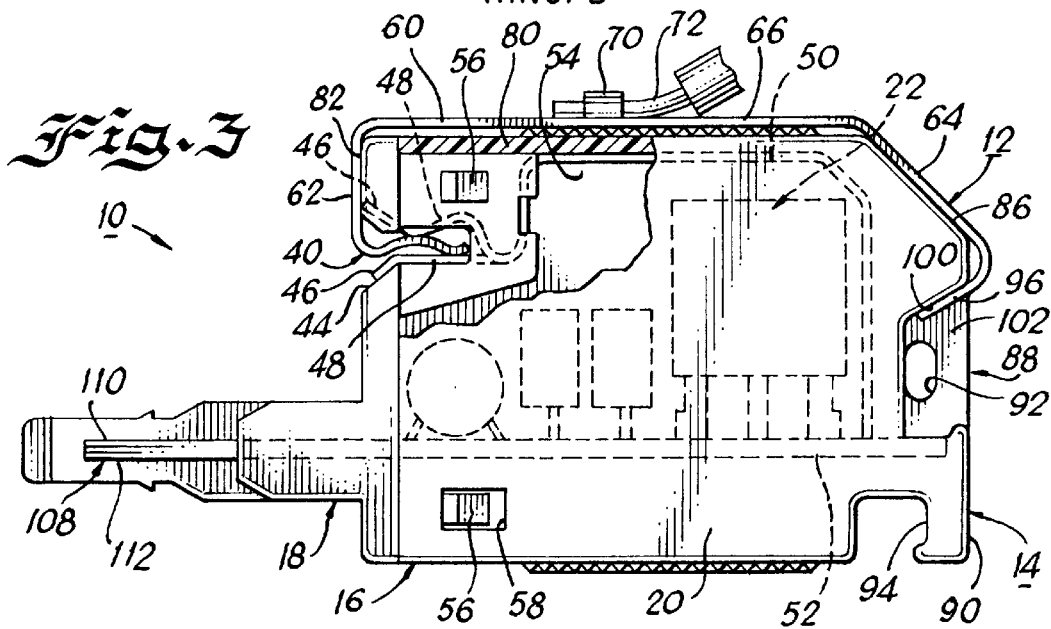

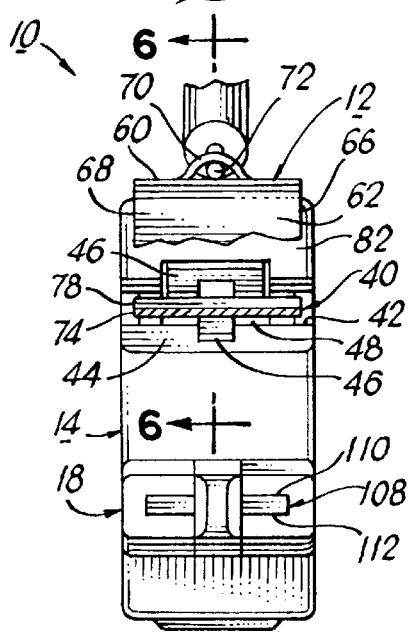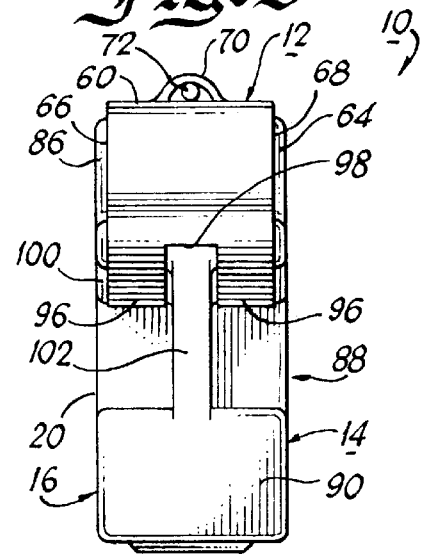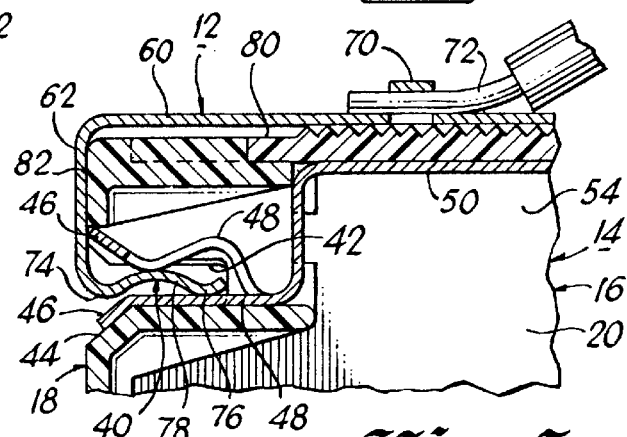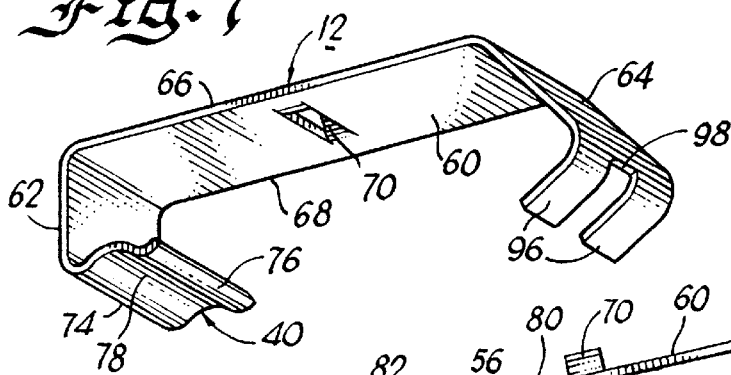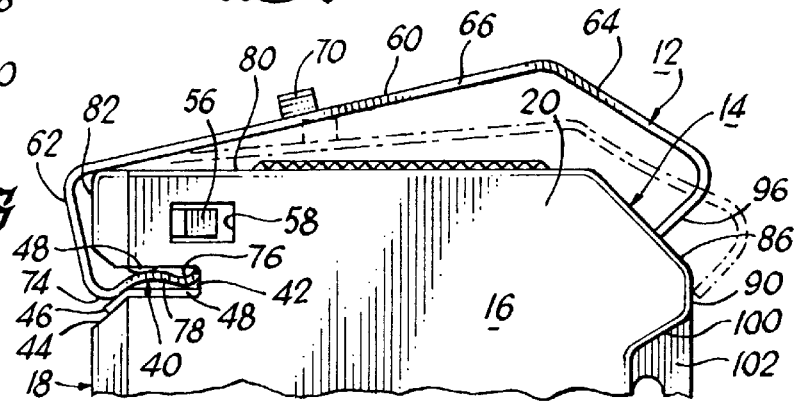

TELEPHONE AND DATA COMMUNICATIONS LINE PROTECTION MODULE AND GROUNDING SPRING CLIP

FIELD OF THE INVENTION

The present invention relates to a telephone and data communications line protection system, and more particularly to a line protection module for protecting at least one telephone line pair and an electrical grounding, earthing spring clip.

DESCRIPTION OF THE PRIOR ART

Overvoltage protection devices are commonly used with telephone lines for protecting telephone equipment against hazardous voltages. Sources of transients include lightning, inductive switching electromagnetic interference (EMI), electrostatic discharge (ESD) and nuclear EMP (NEMP). Overvoltage protection circuitry that overcomes many disadvantages of the prior art circuitry is disclosed in Pelegris, U.S. Pat. No. 5,357,568, issued Oct. 18, 1994, Pelegris, U.S. Pat. No. 5,359,657, issued Oct. 25, 1994, McCartney, U.S. Pat. No. 4,758,920, issued Jul. 19, 1988 and McCartney et al., U.S. Pat. No. 4,941,063, issued Jul. 10, 1990 and assigned to the assignee of the present invention.

A problem with many known overvoltage protection arrangements is the difficulty of providing an effective and reliable ground connection. Typically multiple protection modules are installed side-by-side in a wire terminating base adapted for terminating a plurality of telephone line pairs. A unitary elongated grounding strip or bar typically is used together with the multiple protection modules to provide a grounding connection for all of the multiple protection modules. Such unitary elongated grounding strips or bars are subject to reliability problems, and they add to the overall expense, size, and complexity of the known overvoltage protection arrangements. Also, a problem with a common grounding strip or bar can disrupt the operation of all the associated multiple protection modules.

A need exists for an improved, effective and reliable electrical grounding arrangement for telephone line protection modules. It is desirable to provide such improved electrical grounding arrangement for telephone line protection modules that eliminates the need for the conventional grounding bar.

SUMMARY OF THE INVENTION

Important objects of the present invention are to provide an improved telephone and data communications line protection apparatus, to provide such telephone and data communications line protection apparatus including an improved, effective and reliable electrical grounding arrangement; and to provide such apparatus overcoming many of the disadvantages of prior art arrangements.

In brief, a telephone and data communications line protection apparatus is provided for protecting at least one telephone line pair. The telephone and data communications line protection apparatus includes a housing containing protection circuitry for protecting at least one telephone line pair. The housing includes a cavity for receiving a terminal portion of an electrical grounding, earthing spring clip member. The protection circuitry includes an electrical grounding contact extending into a housing cavity for electrical and mechanical contact engagement with the terminal portion of the electrical grounding, earthing spring clip member.

In accordance with a feature of the invention, the electrical grounding, earthing spring clip member has a predetermined profile corresponding to the housing. The electrical grounding, earthing spring clip member includes an aperture to receive a grounding wire.

BRIEF DESCRIPTION OF THE DRAWINGS

The present invention together with the above and other objects and advantages may best be understood from the following detailed description of the preferred embodiments of the invention illustrated in the drawings, wherein:

FIG. 1 is a perspective view of a telephone and data communications line protection apparatus in accordance with the present invention;

FIG. 2 is a schematic diagram illustrating protection circuitry of the telephone and data communications line protection apparatus of FIG. 1;

FIG. 3 is a side view of the telephone and data communications line protection apparatus of FIG. 1 with a portion broken away to illustrate a grounding connection;

FIG. 4 is a first end view of the telephone and data communications line protection apparatus of FIG. 1;

FIG. 5 illustrates a second outwardly extending end of the telephone and data communications line protection apparatus of FIG. 1;

FIG. 6 is an enlarged detailed sectional view taken along a line 6—6 of FIG. 4 illustrating a grounding connection of the telephone and data communications line protection apparatus of FIG. 1;

FIG. 7 is a perspective view of an electrical grounding, earthing spring clip member of the telephone and data communications line protection apparatus of FIG. 1;

FIG. 8 is a detailed view illustrating the installation of the electrical grounding, earthing spring clip member with the grounding connection of the telephone and data communications line protection apparatus of FIG. 1.

DETAILED DESCRIPTION OF THE PREFERRED EMBODIMENTS

Having reference now to FIG. 1, there is shown telephone and data communications line protection apparatus generally designated by the reference character 10 of the invention. Telephone and data communications line protection apparatus 10 includes an electrical grounding, earthing spring clip member generally designated by 12 and a protection module generally designated by 14 for protecting at least one telephone line pair. The protection module 14 includes a housing generally designated by 16 formed by a base member 18 and a cover 20.

Referring also to FIG. 2, there is shown exemplary protection circuitry generally designated by 22 included within housing 16. Protection circuit 22 includes a plurality of transient voltage clamping devices 24, 26 and 28 connected between the electrical grounding, earthing spring clip member 12 and a telephone line pair, and a pair of current limiting resistors 30 and 32 connected in series with the TIP/A, RING/B lines, respectively. Protection circuit 22 advantageously is of the type disclosed in the above described Pelegris, U.S. Pat. No. 5,357,568, issued Oct. 18, 1994, Pelegris, U.S. Pat. No. 5,359,657, issued Oct. 25, 1994, McCartney, U.S. Pat. No. 4,758,920, issued Jul. 19, 1988 and McCartney et al., U.S. Pat. No. 4,941,063, issued Jul. 10, 1990. The subject matter of the above-identified patents is incorporated herein by reference.

Referring also to FIGS. 3, 7 and 8, the electrical grounding, earthing spring clip member 12 has a predetermined profile corresponding to the housing 16 of the protection module 14. The electrical grounding, earthing spring clip member 12 has a terminal portion generally designated by 40. The housing 16 includes a cavity 42 for receiving the terminal portion 40 of the electrical grounding, earthing spring clip member 12. The housing cavity 42 has a tapered open face 44 supporting a respective end portion 46 of an electrical grounding contacts 48 of the protection circuitry 22 extending into the cavity 42. The terminal portion 40 of the electrical grounding, earthing spring clip member 12 is inserted into the housing cavity 42 for electrical and mechanical contact engagement with the electrical grounding contacts 48. A generally L-shaped extension 50 of the electrical grounding contacts 48 is contained within the housing cover 20 and connected to a printed wiring board 52 carrying the protection circuitry 22 shown in FIG. 2. The housing base 18 and housing cover 22 together define a cavity 54 containing the printed wiring board 52 and the electrical grounding extension 50. The housing base 18 and housing cover 20 include cooperating latching ledges 56 and latching apertures 58, respectively for snap-fit engagement to retain the base 18 and cover 20 together. The housing base 18 and housing cover 20 are unitary members formed of an electrically insulating synthetic material by injection molding technique.

Electrical grounding, earthing spring clip member 12 includes an elongated, central portion 60 extending in a plane between opposed end portions 62 and 64. Elongated central portion 60 is generally rectangular including opposed, parallel sides 66 and 68. An grounding wire receiving aperture loop 70, for example, is punched from the elongated central portion 60 for receiving a separate grounding wire 72. The grounding wire 72 can be connected to earth ground by various conventional arrangements, such as, by connection with an available grounding distribution frame (not shown).

The terminal portion 42 of the electrical grounding, earthing spring clip member 12 includes a pair of resilient, U-shaped portions 74 and 76 with a central resilient, inverted U-shaped portion 78 between the U-shaped portions 74 and 76. The portions 74, 76, and 78 are formed in the terminal portion 42 in order to effectively provide and maintain electrical and mechanical contact engagement with the protection circuitry electrical grounding contacts 48.

The electrical grounding, earthing spring clip member 12 has an overall profile conforming to the housing 16 for easy assemble with the protection module 14. The central portion 60 of the electrical grounding, earthing spring clip member 12 is supported on a housing side 80. The end portion 62 of the electrical grounding, earthing spring clip member 12 is supported on a housing end portion 82 adjacent the housing cavity 42. The end portion 64 is supported by an inclined surface portion 86 of an outwardly extending housing end 88 defining a flange 90 and an aperture 92. Outwardly extending housing cover end 88 includes the inclined surface portion 86 to provide access for a blade, such as a screw driver, to a recess 94 under the flange 90 in installations with multiple rows of installed modules 14. Both the flange 90 and aperture 92 are used to facilitate removal of the module 14 from an associated base (not shown). The end portion 64 of the electrical grounding, earthing spring clip member 12 includes a pair of resilient fingers 96 separated by a cutout, recessed portion 98 for press-fit engagement with housing wall portions 100 separated by ledge 102.

The overall simple shape of the electrical grounding, earthing spring clip member 12 facilitates ease of manufacture. Electrical grounding, earthing spring clip member 12 is a unitary, stamped and formed member formed of an electrically conductive sheet metal material, such as, copper or phosphorous bronze, 20 gage.

Referring to FIGS. 1 and 3, printed wiring board 52 includes a terminal end portion generally designated by 108 carrying a first pair of contacts 110 and a second pair of contacts 112 provided on opposites sides of the printed wiring board. The first pair of contacts 110 are connected with an OUTPUT TIP/A line and an OUTPUT RING/B line and a second pair of contacts 112 are connected with an INPUT TIP/A line and an INPUT RING/B line when the module 14 is connected with a telephone line pair.

While the present invention has been described with reference to the details of the embodiments of the invention shown in the drawing, these details are not intended to limit the scope of the invention as claimed in the appended claims.

What is claimed is:

1. A telephone and data communications line protection apparatus for protecting at least one telephone line pair comprising:

protection circuitry for protecting at least one telephone line pair;

a housing containing said protection circuitry; said housing including a terminal-receiving cavity;

said protection circuitry including an electrical grounding contact extending into said housing terminal-receiving cavity;

an electrical grounding, earthing spring clip member having a terminal portion received in said housing terminal-receiving cavity for electrical and mechanical contact engagement with said electrical grounding contact of said protection circuitry;

said electrical grounding, earthing spring clip member having a predetermined profile corresponding to said housing including an elongated central portion extending between first and second end portions supported on said housing; said first end portion including said terminal portion;

said second end portion of said electrical grounding, earthing spring clip member being a resilient end portion supported by an outwardly extending housing end; and said elongated central portion of said electrical grounding, earthing spring clip member including means for connecting to an electrical conductor grounding wire.

2. A telephone and data communications line protection apparatus as recited in claim 1 wherein said electrical grounding, earthing spring clip member terminal portion received in said housing terminal-receiving cavity includes at least one resilient, generally U-shaped portion providing electrical and mechanical contact with said protection circuitry electrical grounding contact.

3. A telephone and data communications line protection apparatus as recited in claim 1 wherein said electrical grounding, earthing spring clip member resilient end portion includes at least one resilient finger for press-fit engagement with a housing wall of said outwardly extending housing end.

4. A telephone and data communications line protection apparatus as recited in claim 1 wherein said outwardly extending housing end includes an aperture to facilitate removal of the telephone and data communications line protection apparatus.

5. A telephone and data communications line protection apparatus as recited in claim 1 wherein said outwardly extending housing end includes an outwardly extending flange to facilitate removal of the telephone and data communications line protection apparatus.

6. A telephone and data communications line protection apparatus as recited in claim 1 wherein said outwardly extending housing end includes an inclined surface portion.

7. A telephone and data communications line protection apparatus as recited in claim 1 wherein said housing includes a base and a cover, and said base and said cover including cooperating means for snap-fit engagement together.

8. A telephone and data communications line protection apparatus for protecting at least one telephone line pair comprising:

protection circuitry for protecting at least one telephone line pair;

a housing including a base and a cover containing said protection circuitry; said housing including a terminal-receiving cavity; wherein said base and said cover are formed by molding of a synthetic, electrically insulating material;

said protection circuitry including an electrical grounding contact extending into said housing terminal-receiving cavity;

an electrical grounding, earthing spring clip member having a terminal portion received in said housing terminal-receiving cavity for electrical and mechanical contact engagement with said electrical grounding contact of said protection circuitry;

said electrical grounding, earthing spring clip member having a predetermined profile corresponding to said housing including an elongated central portion extending between first and second end portions supported on said housing; said first end portion including said terminal portion;

said second end portion of said electrical grounding, earthing spring clip member being a resilient end portion supported by an outwardly extending housing end; and said electrical grounding, earthing spring clip member including a grounding wire receiving aperture loop formed in said elongated central portion for connecting to an electrical conductor grounding wire.

9. A telephone and data communications line protection apparatus as recited in claim 1 wherein said electrical grounding, earthing spring clip member is a stamped and formed metal member.

10. A telephone and data communications line protection apparatus as recited in claim 1 wherein said electrical grounding, earthing spring clip member is formed of an electrically conductive sheet metal material.

* * * * *